US009141519B2

(12) United States Patent
Subramanian et al.

(10) Patent No.: US 9,141,519 B2
(45) Date of Patent: Sep. 22, 2015

(54) ACCURATE IDENTIFICATION OF SOFTWARE TESTS BASED ON CHANGES TO COMPUTER SOFTWARE CODE

(75) Inventors: Sriram Subramanian, Bangalore (IN); Rajasekar Venkatesan, Bangalore (IN); Manjunath Bandi, Bangalore (IN); Varatharajan Irusappan, Tamil Nadu (IN); Anand Pritam, Bhagalpur (IN)

(73) Assignee: Infinera Corporation, Sunnyvale, CA (US)

( * ) Notice: Subject to any disclaimer, the term of this patent is extended or adjusted under 35 U.S.C. 154(b) by 200 days.

(21) Appl. No.: 12/897,790

(22) Filed: Oct. 5, 2010

(65) Prior Publication Data

US 2012/0084756 A1     Apr. 5, 2012

(51) Int. Cl.
*G06F 11/36*     (2006.01)
*G06F 9/44*      (2006.01)

(52) U.S. Cl.
CPC .......... *G06F 11/3676* (2013.01); *G06F 11/368* (2013.01); *G06F 11/3672* (2013.01)

(58) Field of Classification Search
None
See application file for complete search history.

(56) References Cited

U.S. PATENT DOCUMENTS

| | | | | |
|---|---|---|---|---|
| 5,335,342 | A * | 8/1994 | Pope et al. | 714/38.13 |
| 7,428,726 | B1 * | 9/2008 | Cowan et al. | 717/122 |
| 7,730,452 | B1 * | 6/2010 | Li et al. | 717/124 |
| 8,037,453 | B1 * | 10/2011 | Zawadzki | 717/123 |
| 8,276,123 | B1 * | 9/2012 | Deng et al. | 717/125 |
| 8,423,960 | B2 * | 4/2013 | Farchi et al. | 717/124 |
| 2005/0223357 | A1 * | 10/2005 | Banerjee et al. | 717/120 |
| 2005/0229159 | A1 * | 10/2005 | Haba et al. | 717/122 |
| 2007/0088986 | A1 * | 4/2007 | Stark et al. | 714/32 |
| 2007/0269209 | A1 * | 11/2007 | Rapp et al. | 398/34 |
| 2008/0082661 | A1 * | 4/2008 | Huber | 709/224 |
| 2009/0138855 | A1 * | 5/2009 | Huene et al. | 717/125 |
| 2009/0249298 | A1 * | 10/2009 | Blount et al. | 717/125 |
| 2010/0262866 | A1 * | 10/2010 | Nir-Buchbinder et al. | 714/38 |
| 2010/0281310 | A1 * | 11/2010 | Hou et al. | 714/45 |

(Continued)

OTHER PUBLICATIONS

Zhu et al., "Debugging Network Management Scripting Applications", Integrated Network Management 1999, pp. 953-954, downlowed frm IEEE Xplore on Nov. 26, 2012.*

(Continued)

*Primary Examiner* — Thuy Dao
*Assistant Examiner* — Stephen Berman
(74) *Attorney, Agent, or Firm* — David L. Soltz

(57) ABSTRACT

Consistent with the present disclosure, a block of software code or "software code block" that is executed while particular tests are carried out is assigned a software code block identifier, which is associated with test identifiers, which, in turn, identify the tests that were performed. The software code block identifiers and corresponding test identifiers are then stored in a database. When a portion of the software code block is later modified, either by a change to one or more lines of the code or by deleting or adding code, the corresponding software code block identifier is determined or selected, and then used to access the corresponding test identifiers from the database. The test identifiers are then used to generate a report, for example, that lists each test to be performed in order to determine whether the modified software code block operates properly. The above processes of assigning and storing software code block identifiers and test identifiers may be automated, thereby increasing the likelihood that a complete set of correct tests are performed on the modified software code block. As a result, reliability of the software is improved.

21 Claims, 5 Drawing Sheets

(56) References Cited

U.S. PATENT DOCUMENTS

| | | | |
|---|---|---|---|
| 2011/0035726 A1* | 2/2011 | Davies et al. | 717/110 |
| 2011/0173591 A1* | 7/2011 | Prasad | 717/126 |
| 2011/0202645 A1* | 8/2011 | Abdelal et al. | 709/223 |
| 2012/0079456 A1* | 3/2012 | Kannan et al. | 717/124 |

OTHER PUBLICATIONS

Agilent Technologies, Optical Amplifier Test Solutions, pp. 1-8, downlowed on Nov. 21, 2012 from the Internet: http://cp.literature.agilent.com/litweb/pdf/5968-9856EN.pdf.*

Wikipedia, "Unit Testing", Jan. 11, 2009, pp. 1-6, downloaded from the WaybackMachine Internet archive on Jun. 13, 2013, <URL>: http://web.archive.org/web/20090111192425/http://en.wikipedia.org/wiki/Unit_testing.*

Rothermel et al., "On test suite composition and cost-effective regression testing," 2004, ACM Transactions on Software Engineering and Methodology (TOSEM), vol. 13 Issue 3, pp. 277-331.*

Hao et al., "A similarity-aware approach to testing based fault localization," 2005, Proceedings of the 20th IEEE/ACM international Conference on Automated software engineering, pp. 291-294.*

Orso et al., "Using component metacontent to support the regression testing of component-based software," 2001, IEEE International Conference on Software Maintenance, pp. 716-725.*

* cited by examiner

120

130

ACCURATE IDENTIFICATION OF SOFTWARE TESTS BASED ON CHANGES TO COMPUTER SOFTWARE CODE

BACKGROUND

After changes have been made to software source code, to improve the source code or fix a defect therein, the software source code is typically then tested to determine whether the code operates properly. Such tests may include executing the software source code or blocks thereof based on various input and determining or observing the resulting outputs generated by the tested source code. Since the same block of software source code may be executed in connection with multiple tasks, multiple tests are performed which simulate those tasks or verify adequate operation of the code for each task. Typically, no test should be omitted.

Those who write a given block of software source code are often not familiar with other software code blocks that interact with the given block of code. Thus, those writing software code may not know the interdepencies between various blocks and code, and, accordingly, may not know what blocks of code are affected by each test. Moreover, those administering a given software test may not know which codes are interact with each other when the test is carried out. As a result, neither those who write code nor those who test it may be able to determine a complete set of tests such that all software code blocks are tested after a given block of code is modified.

The identification of a given software source code change and the testing of software code are typically manual processes, and, therefore, may be prone to errors. For example, a particular test may be omitted or the wrong test may be performed. As a result, some defects or errors resulting from the software source code change may remain undetected, and the software source code may be unreliable with respect to certain tasks for which no corresponding test was performed.

SUMMARY

Consistent with an aspect of the present disclosure, a method is provided that comprises storing a plurality of test identifiers and a plurality of software code block identifiers in a data base. Each of the plurality of test identifiers identifies a corresponding one of a plurality of tests, and each of the plurality of software code block identifiers is associated with at least one of the plurality of test identifiers. Each of the plurality of tests is associated with supplying a plurality of electrical inputs to a processor circuit and detecting a plurality of electrical outputs from the processor circuit when the processor circuit executes a corresponding one of the plurality of software code blocks. Each of the plurality of software code block identifiers identifies a corresponding one of a plurality of software code blocks. The method also includes changing a portion of one of the plurality of software code blocks, and determining one of the plurality of software code block identifiers associated with said one of the plurality of software code blocks based on the changed portion of said one of the plurality of software code block. In addition, the method includes selecting a group of the plurality of test identifiers associated with said one of the plurality of software code block identifiers, and identifying a group of the plurality of tests associated with the group of the plurality of test identifiers.

Consistent with a further aspect of the present disclosure, a non-transitory computer-readable medium is provided that stores a computer program for instructing a programmable computer to implement a method. The method includes storing a plurality of test identifiers and a plurality of software code block identifiers in a data base. Each of the plurality of test identifiers identifies a corresponding one of a plurality of tests, and each of the plurality of software code block identifiers is associated with at least one of the plurality of test identifiers. Each of the plurality of tests is associated with supplying a plurality of electrical inputs to a processor circuit and detecting a plurality of electrical outputs from the processor circuit when the processor circuit executes a corresponding one of the plurality of software code blocks. Each of the plurality of software code block identifiers identifies a corresponding one of a plurality of software code blocks. The method also includes changing a portion of one of the plurality of software code blocks, and determining one of the plurality of software code block identifiers associated with said one of the plurality of software code blocks based on the changed portion of said one of the plurality of software code block. In addition, the method includes selecting a group of the plurality of test identifiers associated with said one of the plurality of software code block identifiers, and identifying a group of the plurality of tests associated with the group of the plurality of test identifiers.

Consistent with an additional aspect of the present disclosure, an apparatus is provided that comprises a first database that stores a plurality of test identifiers and a plurality of software code block identifiers, such that each of the plurality of test identifiers identifies a corresponding one of a plurality of tests and each of the plurality of software code block identifiers is associated with at least one of the plurality of test identifiers. Each of the plurality of tests is associated with supplying a plurality of electrical inputs to first processor circuitry and detecting a plurality of electrical outputs from the first processor circuitry when the first processor circuitry executes a corresponding one of the plurality of software code blocks. Each of the plurality of software code block identifiers identifies a corresponding one of a plurality of software code blocks. In addition, a second database is provided that stores a changed portion of one of the plurality of software code blocks. Moreover, second processor circuitry is provided that determines one of the plurality of software code block identifiers associated with said one of the plurality of software code blocks based on the changed portion of said one of the plurality of software code block; selects a group of the plurality of test identifiers associated with said one of the plurality of software code block identifiers; and identifies a group of the plurality of tests associated with the group of the plurality of test identifiers. Alternatively, instead of first and second processor circuitry, one processor circuit may be provided that executes the software code blocks and performs each of these processes.

Advantages of the present disclosure will be set forth in part in the description which follows, or may be learned by practice of the disclosure. It is to be understood that both the foregoing general description and the following detailed description are exemplary and explanatory only and are not restrictive of the invention, as claimed.

The accompanying drawings, which are incorporated in and constitute a part of this specification, illustrate embodiments of the disclosure and together with the description, serve to explain the principles of the invention.

DESCRIPTION OF THE EMBODIMENTS

Consistent with the present disclosure, a block of software code or "software code block" that is executed while particular tests are carried out is assigned a software code block identifier, which is associated with test identifiers, which, in turn, identify the tests that were performed. The software code block identifiers and corresponding test identifiers are then stored in a database. When a portion of the software code block is later modified, either by a change to one or more lines of the code or by deleting or adding code, the corresponding software code block identifier is determined or selected, and then used to access the corresponding test identifiers from the database. The test identifiers are then used to generate a report, for example, that lists each test to be performed in order to determine whether the modified software code block operates properly. The above processes of assigning and storing software code block identifiers and test identifiers may be automated, thereby increasing the likelihood that a complete set of correct tests are performed on the modified software code block. As a result, reliability of the software is improved.

Reference will now be made in detail to the present embodiments, examples of which are illustrated in the accompanying drawings. Wherever possible, the same reference numbers will be used throughout the drawings to refer to the same or like parts.

Figure 1A:
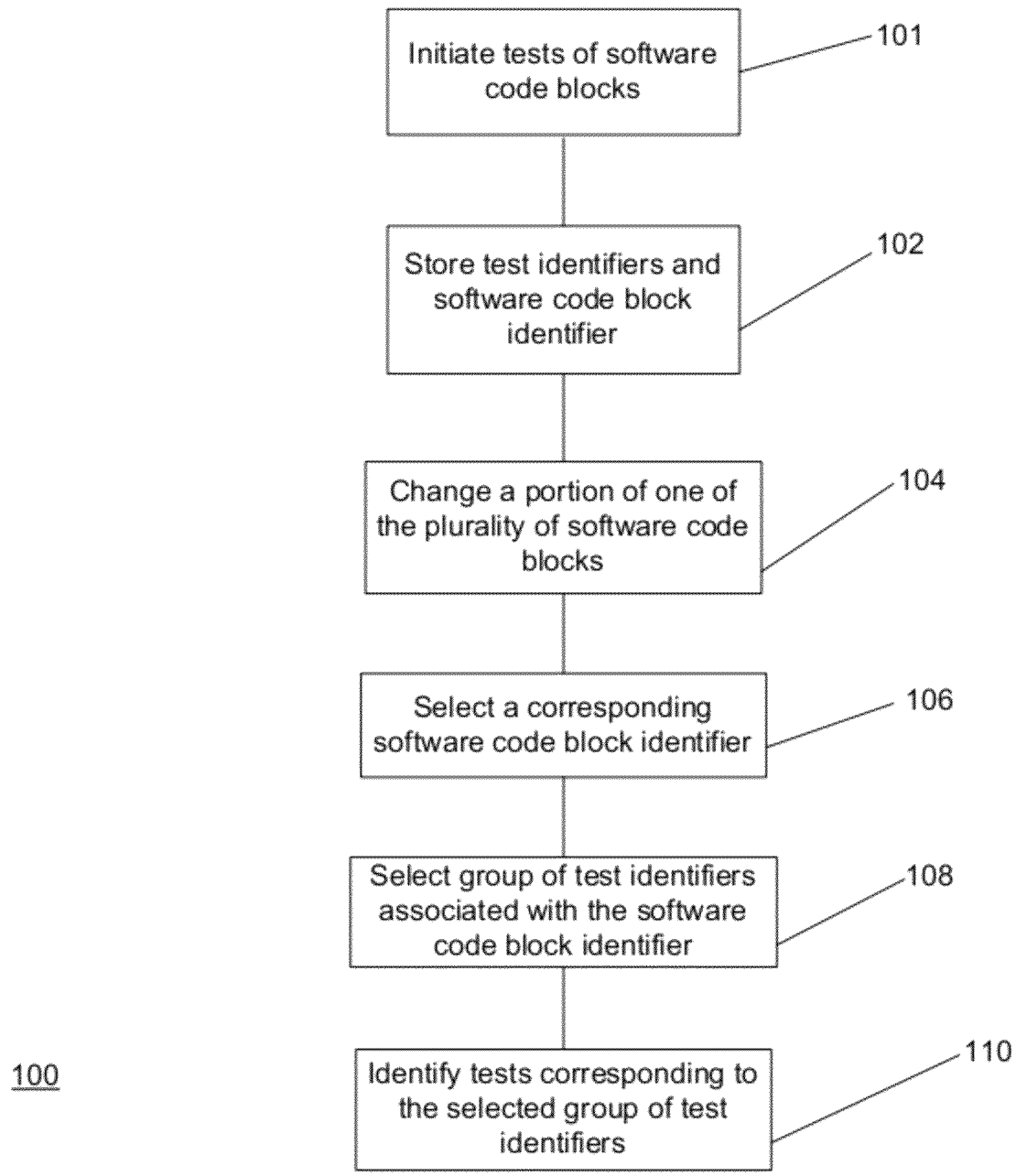
FIG. 1a illustrates a flowchart listing steps of a method consistent with an aspect of the present disclosure.
Figure 2A:
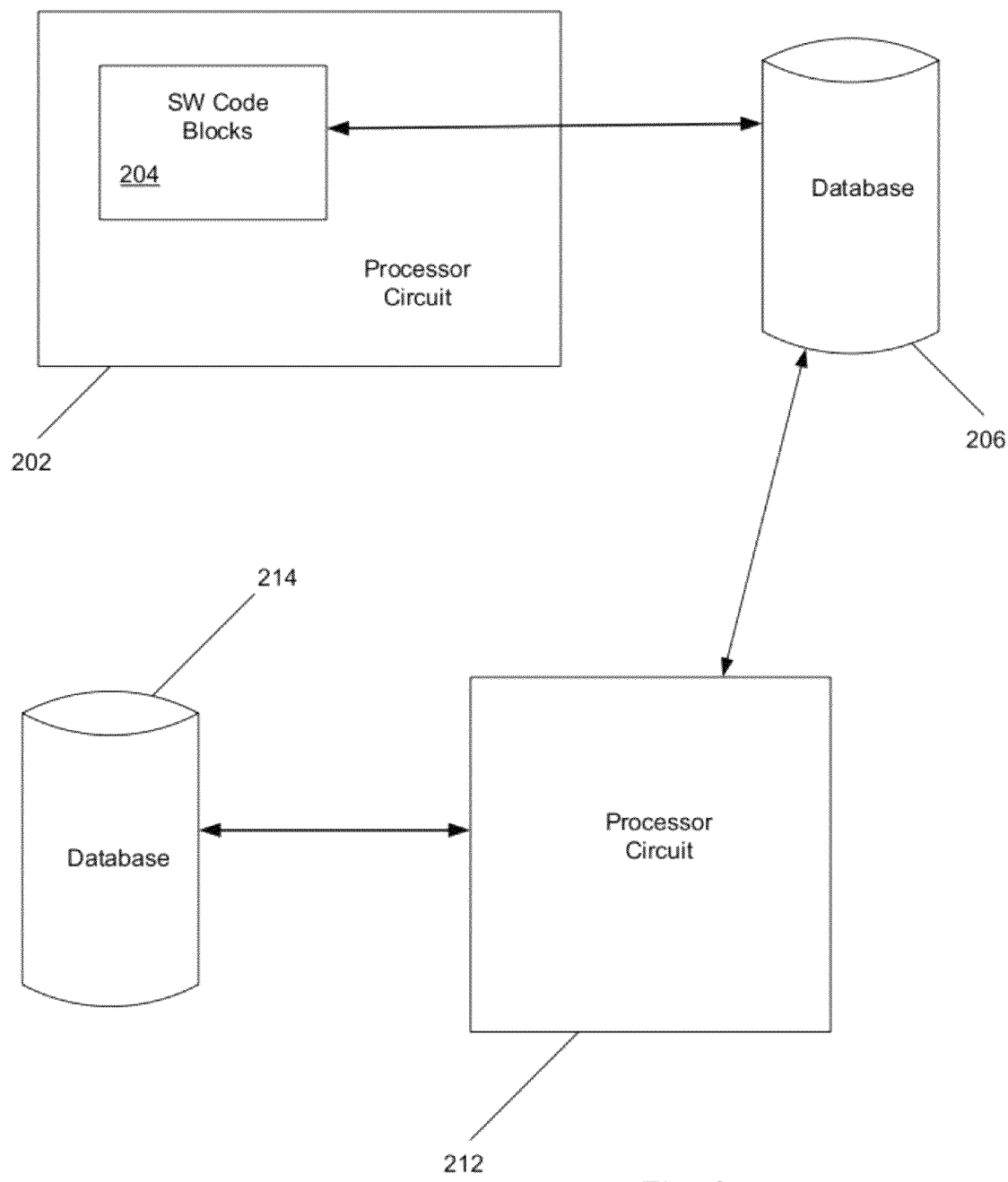
FIG. 2a illustrates a system consistent with an aspect of the present disclosure.

FIG. 1a illustrates flow chart 100, which lists steps of a method consistent with an aspect of the present disclosure. Flow chart 100 will also be discussed with reference to FIG. 2a, which illustrates a block diagram of system 200 consistent with the present disclosure. During step 101 of flowchart 100, tests of various software code blocks 204 are initiated either manually or in an automated fashion and carried out, such that each block is compiled and executed by processor circuit 202. If the software code blocks 204 are written in a programming language such as Java, a software module 203 (which may also be written in Java) typically identifies each test that is performed and assigns each such test a test identifier. For example, the compiled software code blocks 204 may be instrumented or modified by a known software instrumentation tool such as JavaAssist, such that those software code blocks 204 executed during a particular test are identified and assigned a software code block identifier. Such instrumenting of the compiled software code blocks may be carried out by processor circuit 212 or another processor circuit.

Software module 203 then associates the test identifiers with a corresponding software code block identifier.

Software code blocks 204 may also be referred to as "methods," if written in Java, and the software code block identifiers may be referred to as "method names." Alternatively, software code blocks 204 may be referred to as "functions."

By way of example, each test may be associated with supplying a plurality of electrical inputs or signals to processor circuit 202, such as key strokes input from a keyboard (not shown) or sensed parameters in an optical communication system, as discussed in greater detail below. In response to the electrical inputs and based on the execution of a pertinent one of software code blocks 204, processor circuit 202 may generate a plurality of electrical outputs or signals, which may carry information that is shown on a display, such as a computer monitor, for example. By way of further example, one or more software code blocks 204 may be executed after the code associated therewith is changed to require a login and password (required to log on to a computer including processor 202 and software code blocks 204) of a different character length than that which was required previously.

After all the relevant tests have been completed and under control of software module 203, the software code block identifiers and test identifiers are stored in database 206 (step 102), which may include a conventional memory or memory circuit.

If a portion of one of software code blocks 204 is changed (step 104), such that, for example, one or more lines of code is modified, or code is added or deleted, the changed software code block is entered into or stored in database 214 (which may be similar in construction to database 206), as well as details of what changes were made. Database 214 may be similar to or the same as a database and related software commercially available from Perforce Software, Inc.

The details of the change may include, for example, an indicator as to which lines of code in the corresponding one of software code blocks 204 were altered, and the indicator may be stored in database 214. Software module 203 or other software executed by processor circuit 212 may then determine or select the software code block identifier associated with the software code block in which the change was made (step 106). For example, if software code blocks 204 are written in Java, as noted above, various compiler API classes, such as SourcePositions, CompilationUnitTree, and JavcTask may be employed to identify or determine the modified software code block based on the changed portion, such as a code line number, and thus provide a corresponding software code block identifier.

Based on the determined software code block identifier, software module 203, as executed by processor circuit 212, selects or retrieves those test identifiers associated with the software code block identifier (step 108) from data base 206. The tests corresponding to the selected group of test identifiers, and thus, those tests which should be performed in order to determine adequate performance of the modified software code block are also identified (step 110). A report may then be generated, by processor circuit 202, for example, that lists each of the identified tests.

Figure 1B:
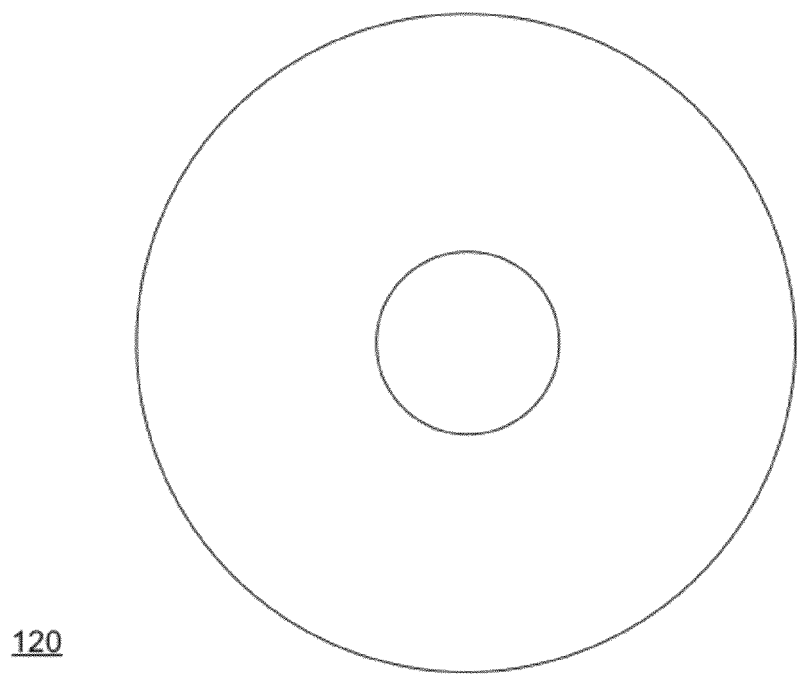
FIG. 1b illustrates an example of a computer readable medium consistent with an aspect of the present disclosure.
Figure 1C:
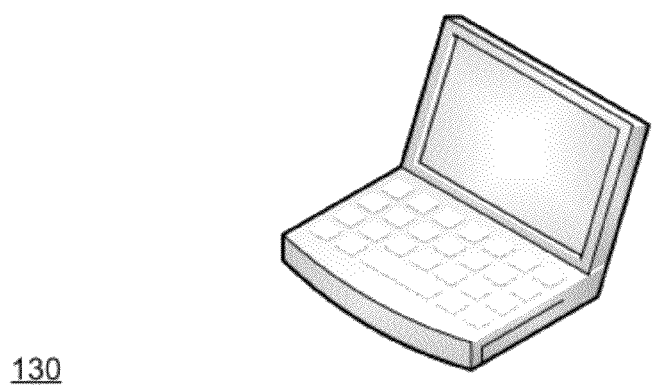
FIG. 1c illustrates a programmable computer.

FIG. 1b illustrates a non-transitory computer-readable medium 120 that stores a computer program for instructing a programmable computer 130 (see FIG. 1c) to implement or carry out the method represented by flowchart 100. Although computer-readable medium 120 is shown as a disk, such as a compact-disk read-only-memory (CD-ROM), other ROMs or other memories are contemplated herein. For example, the computer-readable medium may include fixed hard drives, optical discs, magnetic tapes, semiconductor memories such as read only memories, programmable memories (PROMS of various types), flash memories, etc. An article containing this computer program is utilized by executing the computer program directly from the computer readable medium, or by copying the computer program from one computer readable memory to another computer readable memory.

Figure 2B:
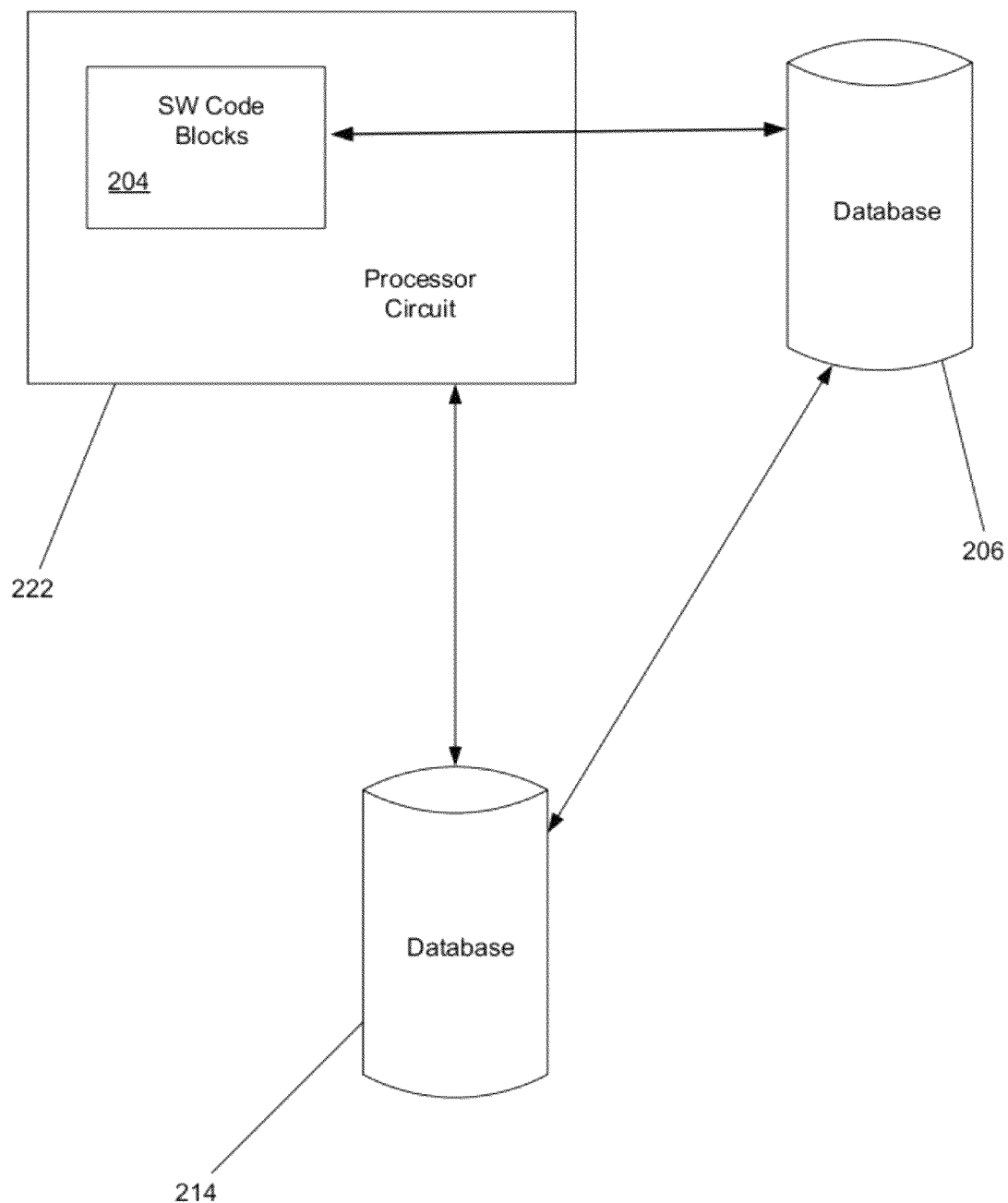
FIG. 2b illustrate an alternative system consistent with a further aspect of the present disclosure.

FIG. 2b illustrates system 250 consistent with a further aspect of the present disclosure. Here, one processor circuit 222 executes software code blocks 204, as well as software module 203, instead of two processor circuits 202 and 212, as discussed above in connection with FIG. 2a. Otherwise, system 250 operates in the same or similar fashion to carry out the method discussed above in connection with flowchart 100 of FIG. 1a.

As used herein, a processor circuit or processor circuitry may include computer hardware and associated software. In addition, a processor circuit or circuitry may include one or more appropriately programmed microprocessors and associated circuitry, hardware, and/or software. Examples of processor circuits that may be used in connection with the present disclosure include Solaris servers, commercially available from Oracle Corporation. Alternatively, the processor circuits may include a laptop computer or desktop computer.

Figure 3:
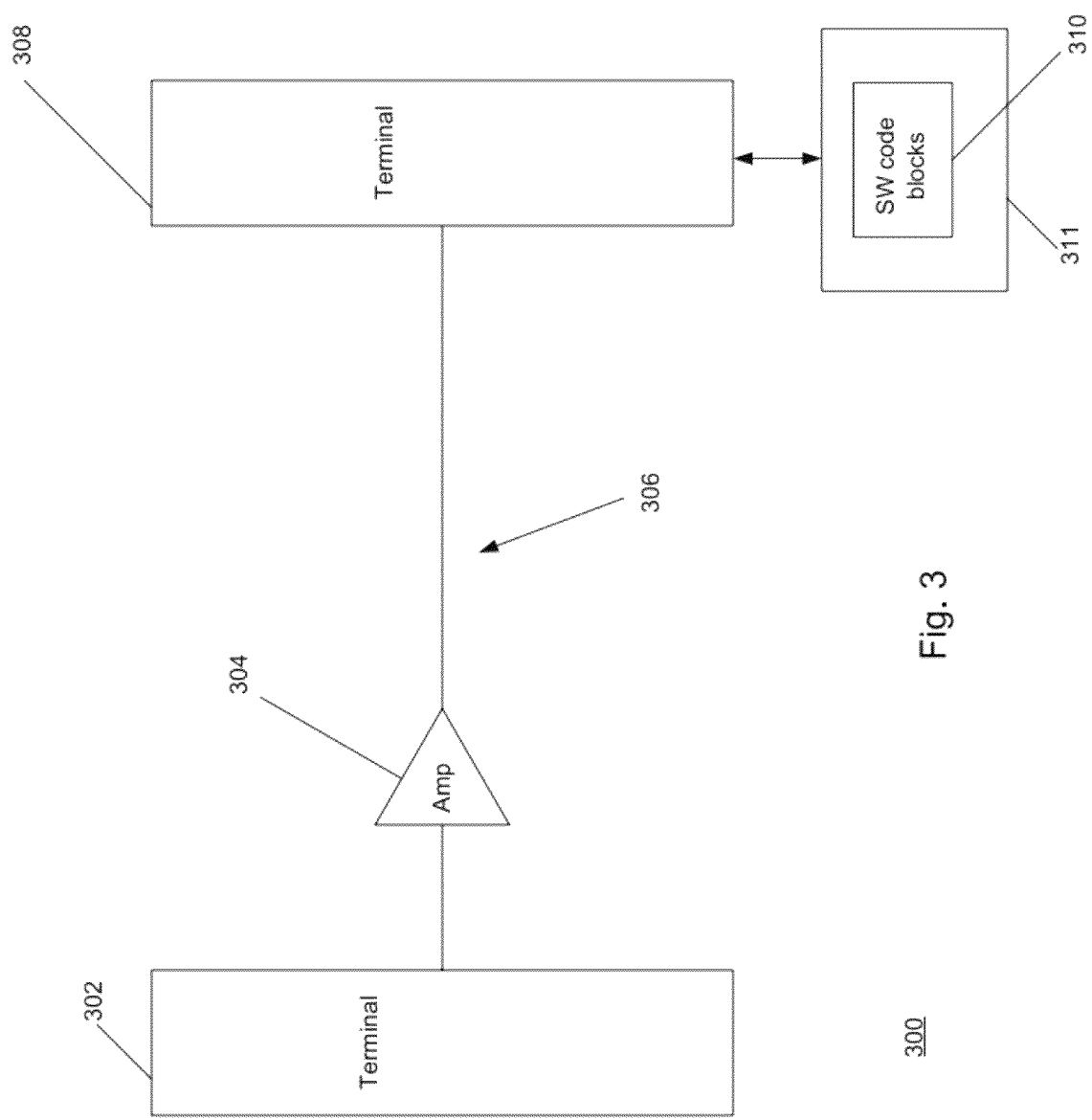
FIG. 3 illustrates an optical communication system consistent with another aspect of the present disclosure.

FIG. 3 illustrates a block diagram of an optical communication system 300 consistent with a further aspect of the present disclosure. System 300 may include a terminal 302 that supplies one or more optical signals, each having a different wavelength, to an optical communication path 306. The optical signals propagate along optical communication path 306 to terminal 308, where the optical signals are converted to corresponding electrical signals, which are then further processed. As further shown in FIG. 3, system 300 includes one or more optical amplifiers, such as optical amplifier 304, which amplifies or boosts the power of the propagating optical signals.

Processor circuit 311, which may be similar to the processor circuits discussed above, may be coupled to terminal 308 and may execute software code blocks 310 for monitoring and sensing optical signal characteristics, such as bit error rate (BER) and optical signal to noise ratio (OSNR). In addition, other processor circuits, similar to processor circuit 311, may be coupled to optical amplifier 304 in order to monitor the OSNR of optical signals input to or output from optical amplifier 304, while other processor circuits may be coupled to terminal 302. Software code blocks 310 may include network management software or network element software that monitor and control communications networks, such as optical communication networks. Examples of such software include network management software commercially available from Infinera Corporation, such as Infinera's Graphical Node Manager (GNM), Digital Network Administrator (DNA), and Server and DNA UI Client.

Tests are preferably carried out following changes to portions of one or more of software code blocks 311, as discussed above. Such tests may generate data that includes monitoring information associated with optical communication system 300. Electrical outputs, similar to those noted above, may be generated by processor circuit 311 as a result of carrying out those tests. The electrical signals may then be detected and data associated with the electrical signals are generated in response to the tests may be stored in a database, such as database 214. Such data may identify a characteristic of an optical amplifier 304, such as the gain of the amplifier. The data may also include monitoring information associated with optical communication system 300, such as BER and OSNR, as noted above. That is, tests may be carried out to insure that software code blocks 310 operate properly to supply accurate gain, BER, and OSNR data, for example.

Thus, consistent with the present disclosure, a complete set of tests may be identified and performed to ensure that a modified software code block operates properly.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, comprising:
storing a plurality of test identifiers and a plurality of software code block identifiers in a first data base, such that each of the plurality of test identifiers identifies a corresponding one of a plurality of tests and each of the plurality of software code block identifiers being associated with at least one of the plurality of test identifiers, each of the plurality of tests being associated with supplying a plurality of electrical inputs to a processor circuit and detecting a plurality of electrical outputs from the processor circuit when the processor circuit executes a corresponding one of the plurality of software code blocks, each of the plurality of software code block identifiers identifying a corresponding one of a plurality of software code blocks;
changing a portion of one of the plurality of software code blocks;
storing the changed portion of said one of the plurality of software code blocks in one of the first data base and a second data base;
storing information identifying a location of the changed portion in said one of the plurality of software code blocks in one of the first data base and a second data base, the information being a line number corresponding to the location of the changed portion in said one of the plurality of software code blocks;
determining one of the plurality of software code block identifiers associated with said one of the plurality of software code blocks based on the line number;
selecting a group of the plurality of test identifiers based on said one of the plurality of software code block identifiers, the group of the plurality of test identifiers including more than one of the plurality of test identifiers; and
identifying a group of the plurality of tests associated with the selected group of the plurality of test identifiers, the group of the plurality of tests including more than one of the plurality of tests.

2. A method in accordance with claim 1, further including performing each test of the group of the plurality of tests.

3. A method in accordance with claim 1, further including:
generating a report that lists the identified group of the plurality of tests.

4. A method in accordance with claim 1, further including storing, in the data base, data associated with the detected plurality of electrical outputs associated with said each of the plurality of tests.

5. A method in accordance with claim 1, wherein the software code blocks include network element software.

6. A method in accordance with claim 1, wherein the software code blocks include network management software.

7. A method in accordance with claim 1, wherein one of the plurality of tests generates data that includes monitoring information associated with an optical communication system.

8. A method in accordance with claim 1, wherein said one of the plurality of software code blocks includes a plurality of lines of code, said changing the portion of one of the plurality of software code blocks includes changing at least one of the plurality of lines of code.

9. A non-transitory computer-readable medium storing a computer program for instructing a programmable computer to implement a method of:
storing a plurality of test identifiers and a plurality of software code block identifiers in a data base, such that each of the plurality of test identifiers identifies a corresponding one of a plurality of tests and each of the plurality of software code block identifiers being associated with at least one of the plurality of test identifiers, each of the plurality of tests being associated with supplying a plurality of electrical inputs to a processor circuit and detecting a plurality of electrical outputs from the processor circuit when the processor circuit executes a corresponding one of the plurality of software code blocks, each of the plurality of software code block identifiers identifying a corresponding one of a plurality of software code blocks;

changing a portion of one of the plurality of software code blocks;

storing the changed portion of said one of the plurality of software code blocks in one of the first data base and a second data base;

storing information identifying a location of the changed portion in said one of the plurality of software code blocks in one of the first data base and a second data base, the information being a line number corresponding to the location of the changed portion in said one of the plurality of software code blocks;

determining one of the plurality of software code block identifiers associated with said one of the plurality of software code blocks based on the line number;

selecting a group of the plurality of test identifiers based on said one of the plurality of software code block identifiers, the group of the plurality of test identifiers including more than one of the plurality of test identifiers; and identifying a group of the plurality of tests associated with the group of the plurality of test identifiers, the group of the plurality of tests including more than one of the plurality of tests.

10. A non-transitory computer-readable medium in accordance with claim 9, wherein the method further includes performing each test of the group of the plurality of tests.

11. A non-transitory computer-readable medium in accordance with claim 9, wherein the method further includes:
generating a report that lists the identified group of the plurality of tests.

12. A non-transitory computer-readable medium in accordance with claim 9, wherein the method further includes storing, in the data base, data associated with the detected plurality of electrical outputs associated with said each of the plurality of tests.

13. A non-transitory computer-readable medium in accordance with claim 9, wherein one of the plurality of tests generates data that identifies a characteristic of an optical amplifier.

14. A non-transitory computer-readable medium in accordance with claim 13, wherein the characteristic is a gain of the optical amplifier.

15. A non-transitory computer-readable medium in accordance with claim 9, wherein one of the plurality of tests generates data that includes monitoring information associated with an optical communication system.

16. A non-transitory computer-readable medium in accordance with claim 9, wherein said one of the plurality of software code blocks includes a plurality of lines of code, said changing the portion of one of the plurality of software code blocks includes changing at least one of the plurality of lines of code.

17. An apparatus, comprising:
a first database that stores a plurality of test identifiers and a plurality of software code block identifiers, such that each of the plurality of test identifiers identifies a corresponding one of a plurality of tests and each of the plurality of software code block identifiers being associated with at least one of the plurality of test identifiers, each of the plurality of tests being associated with supplying a plurality of electrical inputs to first processor circuitry and detecting a plurality of electrical outputs from the first processor circuitry when the first processor circuitry executes a corresponding one of the plurality of software code blocks, each of the plurality of software code block identifiers identifying a corresponding one of a plurality of software code blocks;

a second database that stores a changed portion of one of the plurality of software code blocks and information identifying a location of the changed portion in said one of the plurality of software code blocks, the information being a line number corresponding to the location of the changed portion in said one of the plurality of software code blocks; and second processor circuitry that determines one of the plurality of software code block identifiers associated with said one of the plurality of software code blocks based on the line number, selects a group of the plurality of test identifiers said one of the plurality of software code block identifiers, identifies a group of the plurality of tests associated with the group of the plurality of test identifiers, the group of the plurality of test identifiers including more than one of the plurality of test identifiers, and the group of the plurality of tests including more than one of the plurality of tests.

18. An apparatus in accordance with claim 17, wherein the first databases stores data associated with the detected plurality of electrical outputs associated with said each of the plurality of tests.

19. An apparatus, comprising:
a first database that stores a plurality of test identifiers and a plurality of software code block identifiers, such that each of the plurality of test identifiers identifies a corresponding one of a plurality of tests and each of the plurality of software code block identifiers being associated with at least one of the plurality of test identifiers, a processor circuit, each of the plurality of tests being associated with supplying a plurality of electrical inputs to the processor circuit and detecting a plurality of electrical outputs from the processor circuit when the processor circuit executes a corresponding one of the plurality of software code blocks, each of the plurality of software code block identifiers identifying a corresponding one of a plurality of software code blocks; and a second database that stores a changed portion of one of the plurality of software code blocks and information identifying a location of the changed portion in said one of the plurality of software code blocks, the information being a line number corresponding to the location of the changed portion in said one of the plurality of software code blocks, wherein the processor circuit determines one of the plurality of software code block identifiers associated with said one of the plurality of software code blocks based on the line number, selects a group of the plurality of test identifiers based on said one of the plurality of software code block identifiers, and identifies a group of the plurality of tests associated with the group of the plurality of test identifiers, the group of the plurality of test identifiers including more than one of the plurality of test identifiers, and the group of the plurality of tests including more than one of the plurality of tests.

20. An apparatus in accordance with claim 19, wherein the first database stores data associated with the detected plurality of electrical outputs associated with said each of the plurality of tests.

21. An apparatus in accordance with claim 19, wherein the plurality of software code blocks include network management software that monitors an optical communication network.

* * * * *